Dec. 20, 1966     A. J. WUSTNER     3,293,430
PORTABLE SERIALOGRAPHY APPARATUS WITH A PAIR OF SWINGABLE
HOUSINGS FOR SUPPORTING X-RAY FILM CASSETTES
Filed Oct. 7, 1964     5 Sheets-Sheet 1

INVENTOR
A. J. Wustner
By Samuel Stearman ATTORNEY

Dec. 20, 1966   A. J. WUSTNER   3,293,430
PORTABLE SERIALOGRAPHY APPARATUS WITH A PAIR OF SWINGABLE
HOUSINGS FOR SUPPORTING X-RAY FILM CASSETTES
Filed Oct. 7, 1964   5 Sheets-Sheet 4

INVENTOR
A. J. Wustner,
BY Samuel Stearman
ATTORNEY

United States Patent Office 3,293,430
Patented Dec. 20, 1966

3,293,430
PORTABLE SERIALOGRAPHY APPARATUS WITH A PAIR OF SWINGABLE HOUSINGS FOR SUPPORTING X-RAY FILM CASSETTES
Alois J. Wustner, 11009 Lombardy Road,
Silver Spring, Md. 20901
Filed Oct. 7, 1964, Ser. No. 402,069
15 Claims. (Cl. 250—66)

This invention relates to a serialograph apparatus for use in X-ray diagnostic procedures, such as in the taking of a series of radiographs of the vascular system of the brain for neurological examination.

Although the present invention is particularly intended for and finds its optimum advantages in use for the aforementioned purpose of cerebral angiography, it is likewise capable of advantageous use for other angiographic purposes, such as for the taking of a series of angiocardigraphs, as well as for taking a series of X-ray photographs which reveal the blood circulation through other organs, such as the lungs, kidneys, or the extremities of a human or animal body, whereby to enable diagnosis to be made of the cause of an ailment.

It is the general practise in cerebral angiography to inject contrast media into an artery which leads directly to the brain, this media then diffusing through the vascular phases of the brain so as to enable a series of X-ray pictures to be taken for diagnostic purpose.

In the practise, it is known to provide apparatus by means of which either a single or a series of X-ray film exposures can be made. The taking of a series of such exposures is generally, as well as herein, referred to as "serialography."

In serialography the objective is to obtain a rather rapid series of X-ray exposures within a relatively short period of time, namely, at intervals of from a fraction of a second to one or more seconds, as may be prescribed by the physician or diagnostician.

The known forms of apparatus presently employed for serialography are of two general types. One utilizes a continuous strip of X-ray film and is provided with means for moving appropriate portions of the film into an exposure position as the successive X-ray pictures are taken, and also with means for severing the exposed portions from the continuous film strip after each exposure or a series of exposures is made. The other type utilizes pre-cut films of suitable size, the individual films or plates being contained in individual cassettes, as in the apparatus disclosed in the patents to Sanchez-Perez, No. 2,617,944, dated November 11, 1952, and Clark, No. 2,881,323, dated April 7, 1959. Another form of this type of apparatus utilizes pre-cut film held in a magazine, from which they are successively fed into exposure position and then delivered into another magazine, this apparatus being known commercially as a "Schonander Film Changer."

The commercial forms of serialograph apparatus of the first-named type are relatively heavy and costly pieces of equipment. In the use of that type of serialograph in cases where it is necessary to elevate the device or to change the exposure position between horizontal and vertical, or to a desired angle, it becomes necessary, because of the weight of the device, and its required appurtenances, to employ a suitably equipped stand or other separate means for elevating and angulating the device in order to bring the film into the proper position for exposure.

The presently known forms of serialograph apparatus of the second-named type, namely, those utilizing pre-cut film are likewise relatively heavy and costly. Thus, in the case of the "Schonander" referred to above, as well as in the case of the "Sanchez-Perez," the weight is in excess of several hundred pounds.

Moreover, in the case of the "Sanchez-Perez" serialograph, the latter must be moved on a horizontal axis when changing between a horizontal position for taking A.P. (anterior-posterior) exposures and a vertical position for taking lateral exposures. Still further, when it becomes necessary or desirable to obtain lateral exposures in combination with A.P. exposures, either successively or simultaneously (in so-called bi-plane radiography utilizing two X-ray tubes), it becomes necessary to employ two of such serialographs, one of which is arranged for the lateral exposures, and the other of which is positioned adjacent thereto and arranged for taking the A.P. exposures. It will be obvious that in such cases the cost of the equipment is doubled. The so-called "Schonander" apparatus can be used either for lateral or A.P. exposures, but not both exposure planes, and hence, here again two separate serialographs are required for bi-plane exposures.

Moreover, none of the commercially available forms of serialograph apparatus is capable, so far as I am aware, of selectively utilizing either the standard X-ray film cassettes or Polaroid X-ray film cassettes.

The principal object of my invention is to provide an improved and less costly form of serialograph apparatus.

It is a further object of the invention to provide an apparatus of this character which is so constructed as to be hand portable, in contrast to the heavy serialograph apparatus currently available and which requires, in use, separate stands for elevating or for moving the apparatus into desired exposure positions.

Still another object of the invention is to provide an apparatus of the foregoing character, which is of such relatively simple construction as to make possible its manufacture and sale at a price greatly below the prices of the presently available commercial forms of serialograph apparatus.

A still further and important object of the invention is to provide a serialograph apparatus as aforesaid, so constructed as to enable it to be selectively employed for either the standard X-ray film cassettes or for Polaroid X-ray film cassettes.

A still further object of the invention is to provide an apparatus of the aforesaid character and which will enable the series of angiographs to be obtained manually in quick succession either in A.P. or lateral planes, utilizing any of the available types of stationary or portable X-ray equipment.

A further and important object is to provide an apparatus as aforesaid, constructed to enable it to be used for obtaining exposures either from the right-hand or left-hand side of the patient.

Yet another object of the invention is to provide a hinge of unique and sturdy construction whereby to enable the component of my apparatus utilized for lateral exposures to be hingedly connected to the component thereof utilized for A.P. exposures, and which is so arranged so as to serve selectively: (a) for retaining these two components rigidly in their respective positions at a right angle to one another when the device is in use; (b) for retaining them firmly in a closed, i.e., face-to-face, position relative to one another, for portably moving the unit from one place to another; and (c) for enabling the component to be connected to or disconnected from one another.

The objects and advantages of the invention will be more clearly understood from the more detailed description set forth below, and from the accompanying drawings, in which.

Speaking generally, the serialograph apparatus of my invention is in the form of a compact, hand-portable unit of relatively simple construction, and may be made immediately ready for use with relatively little effort and skill. Moreover, it may be employed for any of the angiographic purposes above-mentioned, regardless of the particular type of stationary or portable X-ray equipment which may be available for use in hospitals, clinics, or offices of doctors engaged in such work. The hand-portable serialograph unit of the invention is constructed so that it may, in use, be placed on an X-ray table, surgical table, or wheel-locking litter.

More specifically, the unit according to the invention comprises essentially two components, generally designated by reference letters L and H, hinged to one another by means more particularly hereinafter described, so that one of the components, namely, component L, may be swung upwardly from the closed position occupied thereby, relative to component H, when the unit is not in use or is being moved or transported. The other component H to which the component L is hinged as aforesaid, occupies a horizontal position when the unit is in use, as more particularly shown in FIGS. 1 and 2, wherein the component L extends upwardly at a right angle with respect to the component H. In the closed position of the components when the unit is not in use, component L occupies the position, relative to component H, shown in dotted outline in FIG. 2.

When the unit is in use, i.e., with the component L disposed so as to extend vertically upward at a right angle with respect to component H, the latter component serves for anterior-posterior serial angiography, and component L serves for lateral serial angiography.

As shown in the drawing, component H comprises a housing 12 of generally rectangular parallelepiped form, having a bottom wall 14, a top wall 16 having an opening 18, side walls 20, 22 and end walls 24, 26. Component L comprises a housing 13 likewise of generally rectangular parallelepiped form, having an outer or back wall 15, an inner or front wall 17 having an opening 19, side walls 21, 23 and end walls 25, 27. Housing 12, along the margin adjacent its longitudinal side wall 22, and housing 13, along the margin adjacent its side wall 23, are provided with mechanism hereinafter described, constituting a unique form of hinge for swinging component L upward from the dotted line position it occupies as shown in FIG. 2, to a vertical position in which it extends upwardly at a right angle with respect to component H, as shown in FIGS. 1 and 2.

Each of the housings 12 and 13 is dimensioned depthwise thereof to accommodate a plurality of cassette holders 30, 31, respectively, either unloaded or loaded with cassettes 32. In housing 12 the cassette holders 30 are superposed upon one another, and in housing 13 the cassette holders 31 are disposed vertically adjacent one another, as indicated in dotted outline in FIG. 2.

Figure 1:
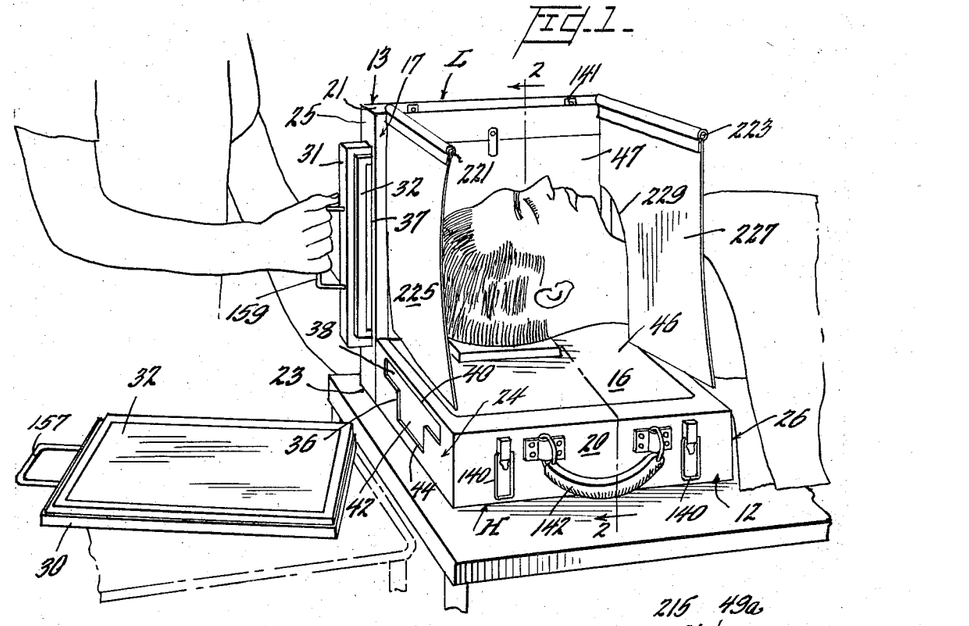
FIG. 1 is a view in perspective, illustrating the apparatus of my invention as arranged for use.
Figure 2:
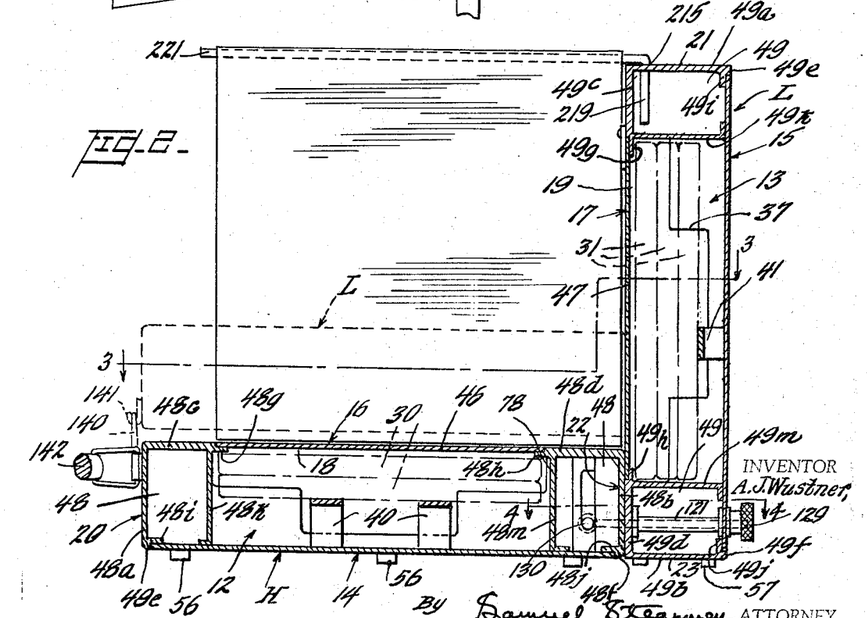
FIG. 2 is a view in cross-section, taken along line 2—2 of FIG. 1.

In FIG. 1 of the drawing, there is shown for illustrative purposes one of the cassette holders, 30, 31 and a cassette 32 positioned therein, removed from one of the housings.

In order to insert and withdraw the cassette holders 30, 31, (whether unloaded or holding cassettes 32) from the components H and L, the front end walls 24 and 25 of housings 12 and 13, respectively, are each formed with a centrally disposed T-shaped opening 36, 37, respectively.

The longitudinal or crossing portion 38 of T-shaped opening 36 is formed so that its outer edge 40 is disposed adjacent top wall 16 of housing 12, and the vertical portion 42 thereof extends toward bottom wall 14, terminating in an inner edge 44 parallel to the edge 40. Thus, as one cassette holder 30 becomes fully inserted into housing 12 through the relatively wide cross-portion 38 of opening 36, it will come to rest on supporting and actuating means (hereinafter described) or on a previously inserted cassette holder resting on the supporting and actuating means in housing 12.

The T-shaped opening 37 in front end wall 25 of housing 13 is correspondingly formed, i.e., with the longitudinal or crossing portion thereof having its outer edge disposed adjacent the front wall 17 of housing 13, and the narrower portion of the opening extending toward rear wall 15. Accordingly, and as will be evident from FIGS. 2 and 3, as one cassette holder 31 becomes fully inserted into housing 13 through the relatively wide cross-portion of opening 37 it will come to rest when its leading edge comes in contact with the inner surface of end wall 27 and will be held in vertical position either by supporting and actuating means (hereinafter described) acting upon the rear surface of the casette holder, or by a previously inserted casette holder 31 held in position by the aforementioned supporting and actuating means.

Figure 3:
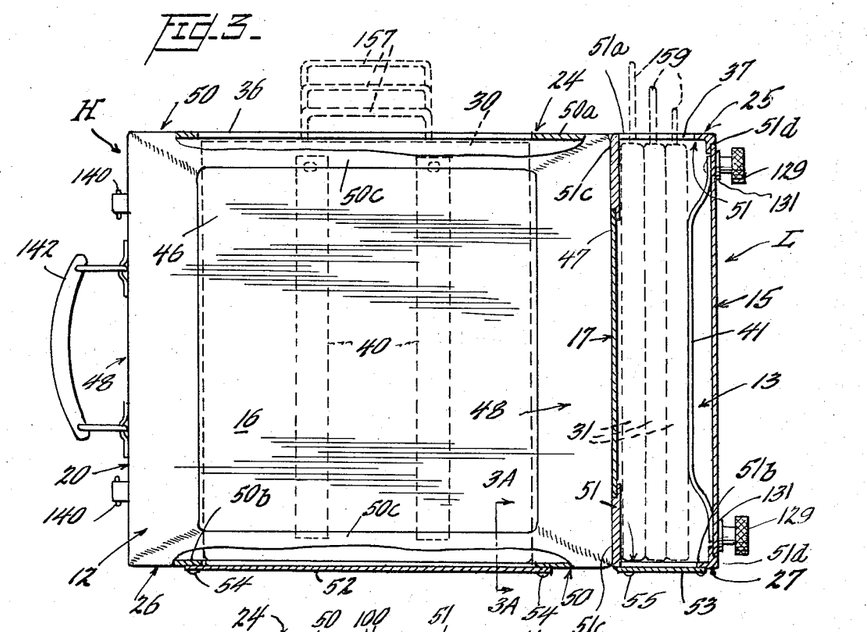
FIG. 3 is a plan view, with parts in cross-section, taken along line 3—3 of FIG. 2.

As will be seen, particularly in FIGS. 2 and 3, the cassette holders 30, 31, whether unloaded or loaded with cassettes when the unit is in use, are disposed centrally of the housings 12, 13, respectively, i.e.,with their longitudinal axes substantially in alignment with the longitudinal axis of the respective housings.

The supporting and actuating means referred to above are constructed and arranged to exert a pressing force upon the bottom surface of the lowermost one of the cassette holders 30 in the stack thereof received in housing 12 and, similarly, upon the bottom surface of the rearmost one of the cassette holders 31 received in housing 13.

The aforesaid supporting and actuating means preferably comprises suitable spring tension devices, such as bowed leaf springs 40, 41 suitably secured as by means of a rivet, at one of their ends to the inner surface of walls 14, 15 of the housings 12, 13, respectively.

The essential purpose of the aforesaid supporting and actuating means is to hold in proper position a stack of cassette holders (with or without a cassette contained in each thereof) in housings 12, 13 and to urge the cassette holders into successive position for exposure of the films through openings 18, 19 and for successive withdrawal of the holders 30, 31 and their contained cassettes from the housings 12, 13 through portion 38 of the openings 36, 37, respectively.

Accordingly, it is desirable to utilize a plurality of such springs 40, suitably spaced from one another, in order to sustain the aggregate weight of the maximum number of cassette-loaded cassette holders that may be accommodated within housing 12. In FIG. 2, there are shown two such spaced springs, each disposed with its longitudinal axis at a substantially equal distance from the longitudinal axis of housing 12. If necessary or desirable, however, three such springs 40 may be utilized, one being disposed along such axis, and one disposed at a suitable spacing from each edge of the one-first named.

In the case of housing 13, the cassette holders 31 and the cassettes held therein are disposed in vertical position with the bottom longitudinal edge of the holders resting on the interior wall or partition 49m (hereinafter referred to), and hence are not under the influence of gravity, as are those in housing 12. In this instance, therefore, the spring tension means is required only to maintain the cassette holders 31 and their contained cassettes in vertical position, and to urge them forwardly, i.e., in the depthwise direction, into successive positions for exposure of the film through opening 19 and for successive withdrawal of the holders 31 and their contained cassettes from housing 13. Accordingly, as shown in FIG. 2 only a single bowed leaf spring 41, possessing sufficient resiliency and sturdiness for the purpose, need be employed. With the foregoing in view, the spring 41 is secured at one of its ends to the inner surface of wall 15, so as to be disposed with the longitudinal axis of the spring spaced a suitable distance below (i.e., in the position of component L shown in FIG. 2) the longitudinal axis of housing 13.

Openings 18, 19 formed in walls 16, 17 of the housings 12, 13, respectively, are each dimensioned longitudinally and transversely thereof so as to be substantially equal in surface area to that of the film to be exposed to the X-ray beams in the use of the apparatus. The aforementioned openings are each covered by any suitable form of grid or filter 46, 47, respectively, adapted for filtering out secondary radiation in accordance with customary practice in radiography. In lieu of the grids or filters, the openings may each be covered by a filler plate of aluminum or the like. The filters, grids or filler plates are removably positioned for covering the openings 18, 19.

Preferably, the housings 12, 13 are each composed of open box-like members 48, 49, along each side of the respective housings, and U-shaped members 50, 51 along each end of the respective housings. Members 50, 51 are joined in any convenient manner, as by welding, to the end edges of members 48, 49. Thus, as more particularly shown in FIGS. 2 and 3, the members 48 are each disposed so that the wall portions 48a, 48b of these members constitute the side walls 20, 22 of housing 12; the wall portions of 48c, 48d thereof constitute the marginal side portions of top wall 16; and the wall portions 48e, 48f, thereof constitute the marginal portions at the sides of bottom wall 14 of housing 12. The wall portions 48c, 48d as well as the portions 48e, 48f are formed with outwardly facing ledges 48g, 48h, and 48i, 48j, respectively, which extend in the direction toward the longitudinal axis of the housing. Correspondingly, members 49 are disposed so that the wall portions 49a, 49b thereof constitute the sidewalls 21, 23, respectively, of housing 13; the wall portions 49c, 49d thereof constitute the marginal portions of front wall 17, of housing 13; and wall portions 49e, 49f thereof constitute the marginal portions of back wall 15. The wall portions 49c, 49d, as well as wall portions 49e, 49f are formed with outwardly facing ledges 49g, 49h and 49i, 49j, respectively, which extend in the direction toward the longitudinal axis of housing 13.

Members 50, 51, which are secured, as above stated, to the respective end edges of members 48, 49, are each of generally U-shaped form, the base portions 50a, 50b constituting the end walls 24, 26, respectively, of housing 12; and the base portions 51a, 51b constituting the end walls 25, 27, respectively, of housing 13. Portions 50c, 50d constitute the marginal end portions of the top and bottom walls 16, 14, respectively, of housing 12. Correspondingly, portions 51c, 51d constitute the marginal end portions of the front and back walls 17, 15, respectively, of housing 13.

The spacing of wall portions 48m, 48l from one another is slightly in excess of the width of cassette holders 30 so as to serve as guides for the movement of the cassette holders into and out of housing 12. Correspondingly, in housing 13, wall portions 49k, 49m are spaced from one another, as in the case of portions 48k, 48m, a distance slightly in excess of the width of cassette holders 31 so as to serve as guides for the insertion and withdrawal of the latter into and out of the housing 13.

It is a feature of my invention that the serialography unit herein described may be utilized in reversible position. That is to say, when by reason of the location of a stationary X-ray machine or for other reasons, it becomes necessary that lateral exposure be obtained from beams emanating from an X-ray machine located on the left-hand side of the patient rather than on his right-hand side, the position of the unit may be reversed from that shown in FIG. 1 to one in which component L is positioned adjacent the right-hand side of the patient.

To the foregoing end, the end walls 26, 27 of the respective housings are each provided with a T-shaped opening arranged and dimensioned like those indicated by reference numerals 36, 37 and covered by a removable plate, 52, 53, respectively held in position by any suitable means such as screws or the like 54, 55. The removable plates 52, 53 serve as backstops for limiting the movement of the cassette holders 30, 31 (whether or not loaded with cassettes) when they are inserted into housings 12, 13.

When it becomes necessary to utilize the unit in a reverse position as above set forth, the plates 52, 53 may be detached from the respective end walls 26, 27 and attached to the opposite end walls 24, 25, thereby enabling the cassette holders 30, 31 and their contained cassettes 32 to be inserted into and withdrawn from the respective housings 12, 13 through the T-shaped openings in end walls 26, 27, respectively, the plates 52, 53 attached to end walls 24, 25 then serving as the backstops for the cassette holders and their contained cassettes.

The outer surface of the bottom wall 14 of housing 12, and the outer surface of side wall 23 of housing 13 are each provided with suitably spaced rubber feet, suction cups, or the like, 56, 57, in order to prevent sliding movement of the unit when set in place for use.

Reference has hereinabove been made to a unique form of hinge mechanism constituting an important feature of the invention, for hinging components H and L to one another. As already indicated, this hinge mechanism enables component L to be easily moved from the dotted lined position shown in FIG. 2, in which the unit may be readily carried by hand, to the position shown in FIGS. 1 and 2, wherein component L extends upwardly at a right angle with respect to component H when the unit is to be used for its various intended purposes in serialography.

In accordance with this feature of the invention, the hinge mechanism is constructed to enable the same to be disposed interiorly of the unit, as hereinafter more fully described, and to assure not only easy movement of component L with respect to component H, but also to serve for selectively maintaining components H and L in proper and rigid relationship to one another in the closed position of component L relative to component H as shown in dotted outline in FIG. 2, as well as in the open position thereof as shown in FIGS. 1 and 2 when the unit is in use, or for permitting easy and rapid connection and disconnection of the components L and H to and from one another.

Figure 5:
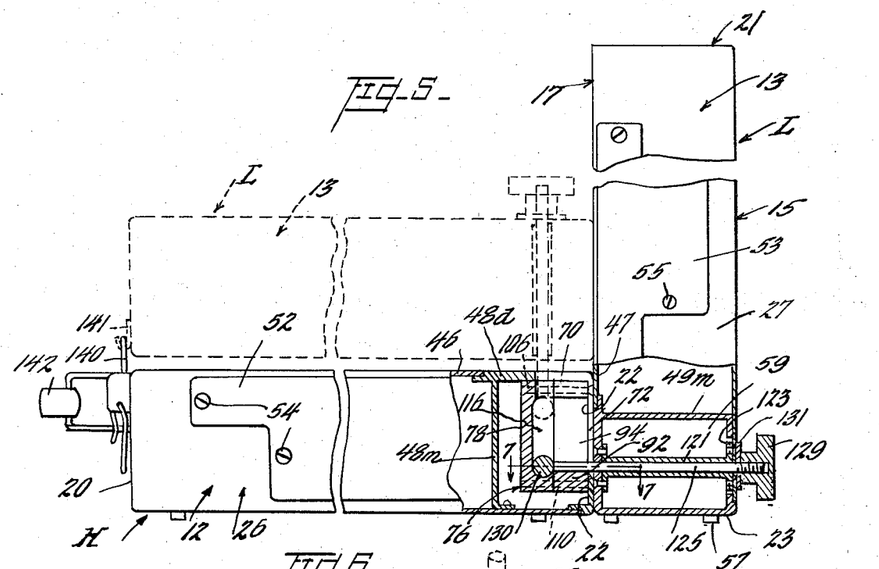
FIG. 5 is a view, partly in outline and partly in cross-section, showing particularly the construction of the hinge employed in accordance with the present invention.
Figure 8:
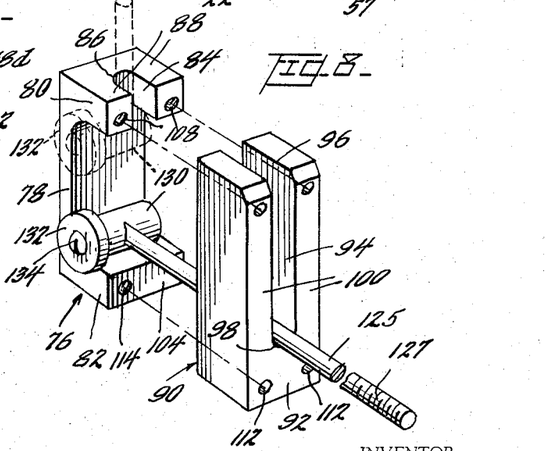
FIG. 8 is an exploded detail view in perspective, illustrating the hinge construction.
Figure 9:
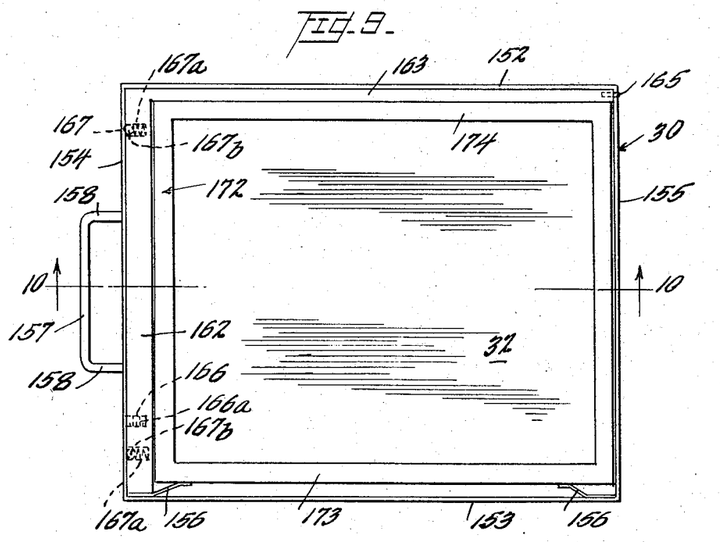
FIG. 9 is a plan view illustrating the cassette holder and a standard X-ray film cassette held thereby in accordance with the invention.

To the foregoing ends, and referring particularly to FIGS. 5 and 8, inclusive, the compartment 58 formed between wall portion 48m and side wall 22 of housing 12, and the compartment 59 formed between wall portion 49m and side wall 23 of housing 13 serve to support the elements of the hinge mechanism, as will now be more fully described.

Figure 6:
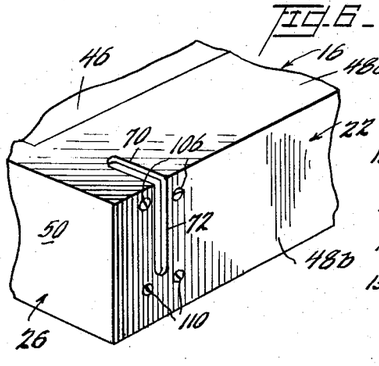
FIG. 6 is a fragmentary perspective view showing a portion of the A.P. component of my serialograph unit, constructed for cooperation with the aforesaid hinge.
Figure 7:
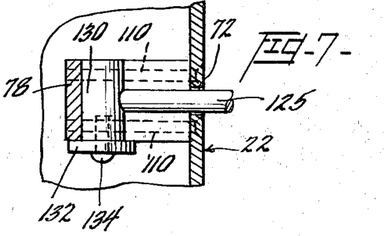
FIG. 7 is an enlarged fragmentary view, partly in plan and partly in cross-section, taken along line 7—7 of FIG. 5.

As will be seen, particularly from FIG. 6, the wall portion 48d of the top wall 16 of housing 12 is formed with a slot 70 adjacent and parallel to each of the respective end walls 24, 26 of the housing. The slots 70 each extend inwardly of the wall portion 48d a substantial distance, the open end of each slot connecting with the open end of a slot 72 extending a substantial distance inwardly from the junction of wall portion 48d with the wall portion 48b constituting the side wall 22 of the housing, each of the slots 72 likewise being disposed adjacent and parallel to the end walls 24 and 26 of the housing.

Figures 3A, 4:
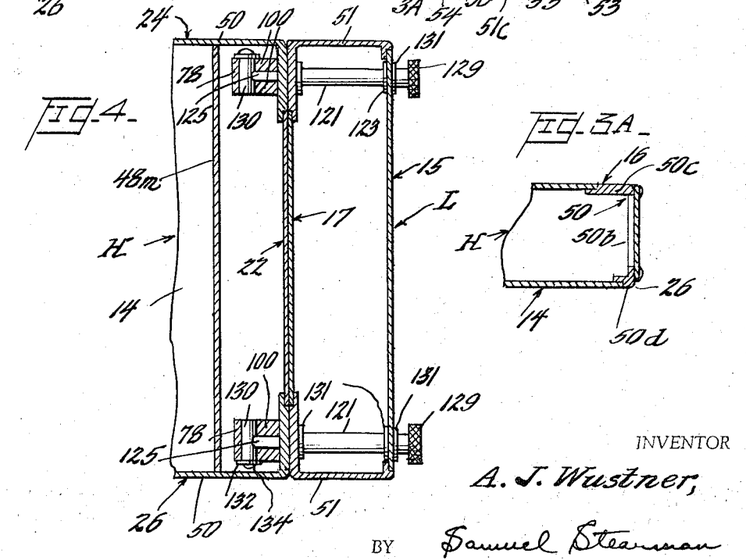
FIG. 3A is a detailed sectional view taken along line 3A—3A of FIG. 3.
FIG. 4 is a view in cross-section, taken along line 4—4 of FIG. 2.

As particularly illustrated in FIGS. 2, 4 and 5, a U-shaped guide member 76 is mounted within compartment 58, adjacent each of the end walls 24, 26, so as to be disposed therein with its back or bridging wall 78 spaced from and parallel to wall portion 48b, its leg 80 disposed with its outer surface closely adjacent the inner surface of wall portion 48d of the housing, and its other leg 82 disposed in spaced relation to the interior surface of the bottom wall 14 of the housing. As shown in FIG. 8, the leg 80 is bifurcated by a central slot 84 extending inwardly from the outer end of the leg and terminating in a rounded inner end 86.

Member 76 may desirably be about 2.75 inches in height, about 0.75 inch in width, and about one inch in depth. The legs 80, 82 are each formed with the inner surface thereof joined to the inner surface of portion 78 along a semi-circle of approximately 0.5 inch diameter, for a purpose to be hereinafter set forth. The distance between the flat portions of the inner surfaces of the legs may desirably be about 1.75 inches.

Fitted into each end of compartment 58, in the space between member 76 and side wall 22, is a second guide member 90, the latter comprising a bifurcated element of substantially the same height and depth as member 76, but preferably of somewhat greater width than the latter. Member 90 is composed of a base portion 92 at the lower end thereof, and a centrally disposed, relatively elongated slot 94 extending vertically from the base portion and throughout the width of the element, to the upper end edge 96 thereof. Slot 94 is of substantially the same depth or transverse dimension as that of slot 84 in member 76, and is formed with a rounded surface 98 at the lower end thereof joining the inner surfaces of legs 100.

Members 90, as above indicated, are positioned adjacent each end of compartment 58, between members 76 and the side wall 22 of the compartment. Legs 100 are each of substantially the same thickness as that of legs 88 formed by the slot 84 of the member 76. The position of each member 90 in compartment 58 is such that the inwardly facing edges of legs 100 are substantially in surface contact, at the upper ends thereof, with the outwardly facing edges of legs 88, and the inwardly facing vertical surface of base 92 is likewise substantially in surface contact with the outwardly facing edge 104 of leg 82 constituting the base of the member 76. Thus, a raceway 116, open at its sides and closed at its upper and lower ends is formed between members 76, 90.

Members 76 and 90 are secured in compartment 58 so that slots 84, 94 of the members 76, 90 are disposed with their axes in transverse alignment with one another and with that of slots 70, 72 formed in the horizontally extending wall portions 48d and the vertically extending side wall 22 of housing 12, respectively. Such securement of the members 76, 90 in the aforesaid positions may be obtained in any desired manner, preferably by means of screw bolts 106 extending through openings formed adjacent the upper end of the side wall 22 of the housing and on each side of the slot 72 therein, and passing through openings which extend through legs 100 adjacent the upper end thereof and to engage threaded openings 108 extending into the legs 88 of the members 76, and similar bolts 110 extending through openings formed adjacent the lower end of side wall 22 and passing through openings 112 which extend through the base 92 of member 90 and to engage threaded openings 114 extending into leg 82 of the members 76.

Mounted within compartment 59 of housing 13 are the other elements of the hinge mechanism. These comprise cylindrical sleeves 121, each fixed adjacent one end of compartment 59 as by means of a flange 123 at each end of the sleeve, and having several openings therein, through which flat head screws may be inserted through registering openings in the back wall 15 and in wall portion 49d of housing 13.

Extending through each sleeve 121 for slidable movement therein is a hinge rod 125 threaded at its outer end as indicated at 127, and joined at its opposite end, as by welding the same, to pivot head 130 approximately midway of the longitudinal axis of the latter and in a position such that the longitudinal axis of the rod 125 extends at a right angle to the longitudinal axis of the pivot head. As will be noted, the latter is thus confined within raceway 116.

The rods 125 are each of approximately 0.25 inch diameter, which latter is slightly less than that of the bore of the sleeves 121, in order to permit sliding of the rods in their respective sleeves. The diameter of rods 125 is also less than the transverse dimension of slots 84, 94 in members 76, 90, in order to permit the rods to move freely therethrough, as described herebelow.

In their assembled position, the above-described elements of each hinge mechanism occupy the positions within the respective compartments 58, 59 as more clearly shown in full lines in FIGS. 2 and 5 when the unit has been set in place and opened for use, i.e., with component L extending upwardly at a right angle with respect to component H. The components are held firmly and, in effect, locked in that position by means of the hinge mechanism. In that position, an internally threaded knob 129 engages the threaded outer end of each of the horizontally disposed rods 125 projecting a short distance outwardly beyond the outer surface of the back wall 15 of housing 13. Preferably, a circular spacer 131, of phenolic or other suitable resin material is interposed on each of the rods 125, between the outer surface of back wall 15 and the inner end of each knob 129, to serve as a bearing surface for the knob.

As will be noted from FIG. 5 when the rods 125 are in the above-described position, the pivot heads 130 are each seated in the rounded (quarter-circular) surface at the junction between portion 78 and leg 82 of member 76. Desirably, in order to assist in retention of the pivot heads in their operating position, a flat washer 132 of nylon, Teflon or like material may be fastened to either of the outer end faces of each pivot head, as by means of a screw 134 passing through the washer and engaging a threaded tap formed at the corresponding end of pivot head. The washers 132 are of an outside diameter in excess of the width of raceways 116 so as to prevent rotary movement of the rods 125.

When it is desired to return component L from its open, i.e., its vertically extending position, in which it is held by the hinge mechanism when the apparatus is in use, to the horizontally extending position, as shown in dotted outline in FIG. 5, this may be done simply by loosening each of knobs 129 sufficiently to permit lifting component L a short distance above the table (or other surface upon which the apparatus is set in place for use)

and then turning component L toward top wall 16 of component H. As will be apparent, when component L is thus lifted, the pivot heads 130 will be carried upwardly in their respective raceways 116 until they come to rest at the respective upper ends thereof as the rods 125 fixed to the pivot heads and portions 78 of members 76, and rods 125 are carried upwardly along slots 72 in side wall 22 and along slots 94 in members 90. As component L is turned over toward top wall 16 of component H, the inner end of hinge rod 125 swings over through slots 70 in the top wall 48*d* of housing 12, and their aligned slots 94 in members 90 and 84 in member 76, until the rods reach the vertical position (shown in dotted outline in FIG. 5), namely, when component L has been brought down to a horizontal position surmounting component H. In that position of the elements of the hinge mechanism, they serve to hold component L in the closed position relative to component H. The components H and L may be firmly held in that relative position by then tightening down the knobs 129 on the threaded outer ends of the rods 125.

As a precaution against separation of components L and H from one another at the side thereof opposite their hinged sides, when they are in the closed position shown in FIG. 5, any conventional form of latching means may be utilized. As illustrative thereof, freely swinging loops 140 mounted on the exterior of side wall 20 of component H and cooperating with hooks or catches 141 mounted on the exterior of side wall 21 of component L, may be employed.

In order to facilitate carrying the apparatus by hand, any conventional form of handle means, such as shown at 142, may be attached along the mid-portion of the exterior of side wall 20 of component H.

Referring now to the cassette holders 30, 31 hereof, they are constructed, as above mentioned, so as not only to permit these holders and their contained cassettes to be readily inserted into the housings 12, 13 and held firmly in stacked relation by springs 40 in housing 12 and in vertically disposed position adjacent one another by spring 41 in housing 13, but so as also to permit rapid, successive withdrawal thereof from the respective housings, after the film in each of the cassettes has been exposed to X-rays for the required time (depending upon the particular seriography task to be accomplished).

As above mentioned, it is an important feature of the invention that the cassette holders are also constructed so as to enable them to be selectively employed for holding either standard X-ray film cassettes or Polaroid film cassettes.

By the term "standard X-ray film cassette" herein is meant a cassette which can accommodate conventional X-ray films of either 10 by 12 inches or 24 by 30 centimeters size.

By the term "Polaroid film cassette" herein is meant the somewhat longer and wider cassettes of special construction developed by the Polaroid Company for use with Polaroid X-ray film.

In FIGS. 9 to 13 of the drawings, there is shown one form of the cassette holders 30 or 31, constructed, in accordance with the invention, for achieving the above-mentioned purposes and advantages.

As there shown, the body of the cassette holder is essentially in the form of a rectangular tray made of suitable sheet material such as stainless steel. The bottom 151 of the tray is bounded at its longitudinal perimeter with upstanding side walls or flanges 152, 153 and at its transverse perimeter with similar end walls 154, 155, the side walls being secured at each end edge thereof to the corresponding end edges of the end walls as by welding or the like. Desirably, the inside dimensions of the tray are approximately 14 inches length and 11.5 inches width. Secured to the inner surface of wall 153, adjacent each of its opposite ends, is a leaf spring 156 having the inner or free end thereof disposed so as to be constrained toward the longitudinal axis of the tray, for a purpose more fully described herebelow.

Affixed centrally of the exterior surface of wall 154, is a U-shaped handle member 157, having each of its legs 158 welded at the end thereof to the wall.

In order to provide for rapid, unobstructed removal of individual cassette holders from the housings 12 and 13 in the seriographic use of the apparatus, the legs 158 of the handles 157 on the several trays constituting the cassette holders to be utilized in each of the components H and L of the apparatus, are of suitably varying lengths for that purpose. Thus, as indicated by dotted outline in FIG. 3, handle 157 on the last or uppermost of the cassette holders 30 inserted in housing 12 and which holds the cassette containing the first film in the series to be exposed, is provided with legs 158 of a length greater than that of the legs 158 of handle 157 affixed to the cassette holder for the cassette containing the next film to be exposed in the series thereof; and similarly (in the case of three films to be exposed in the series), the legs 158 of handle 157 on the latter are longer than those on the cassette holder for the last of the films to be exposed in the series. As a result, the handles on the cassette holders inserted in housing 12 are disposed in staggered or offset relation to one another.

Accordingly, as the films of the series are successively exposed to the X-rays, the cassette holders and their contained cassettes may be immediately withdrawn from housing 12 through opening 36 in the end wall thereof, in that succession, by exerting a relatively light pull on their respective handles 157. As will now be apparent, the described sequential withdrawal of the cassette holders from housing 12 may thus be achieved rapidly and without risk that withdrawal of the first or second in the series will jar or impart other objectionable motion to the one or ones undergoing or yet to undergo exposure to the X-rays. It has been found in actual use of the apparatus that this construction and mode of use of the cassette holders contribute greatly to obtaining exposed X-ray films of improved clarity and otherwise free of flaws. Hence, the films thus obtained are of superior quality to those presently obtainable in practice, for revealing to the physician or diagnostician an accurate record of the blood flow through the vascular system of the brain or through other organs of the patient being studied.

Without further detailed description, it will be evident that the handles 159 (also shown in dotted outline in FIG. 3) for the cassette holders 31 utilized in housing 13 for lateral exposures are constructed, arranged and operated in the same manner as above described with reference to cassette holders 30.

Figure 11:
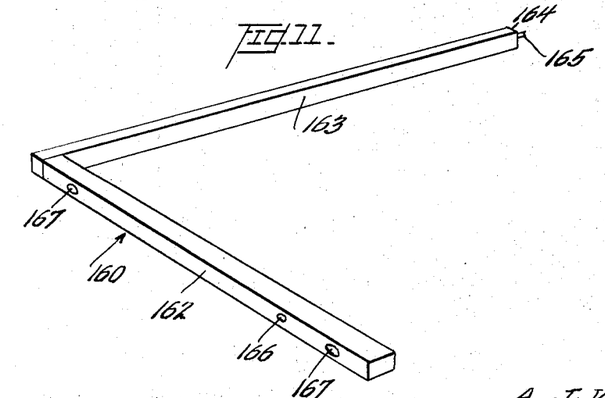
FIG. 11 is a perspective view showing the means illustrated in FIG. 9 for adapting the cassette holder for selective use either with standard X-ray film cassettes or with Polaroid X-ray film cassettes.

Continuing with the description of cassette holders 30, 31, and referring particularly to that aspect thereof concerning their use for selectively holding either standard X-ray film cassettes or Polaroid X-ray film cassettes, the trays or holders are each provided with a readily insertable and readily removable L-shaped insert or adaptor 160 best shown in perspective in FIG. 11.

This adaptor, which desirably is fashioned from any suitable material such as aluminum alloy, has a transversely extending arm 162 of rectangular cross-section, and a longitudinally extending arm 163 of similar cross-section, welded at one of its ends to the one end edge of arm 162. The latter is of a length which, together with the width of arm 163, amounts to a total dimension about ⅛ inch less than the transverse inside dimension of tray. Arm 163 is of a length which is equal to the longitudinal inside dimension of the tray, and is provided at its end edge 164 with a pin 165 for engaging a correspondingly shaped opening in end wall 155 of the tray adjacent the junction of wall 155 with wall 152, whereby to prevent the adaptor from being inadvertently displaced from the tray.

Extending through wall 154 of the tray, adjacent one of the ends thereof, is a small opening which registers with a recess 166 in arm 162 of the adaptor for accommodating a set screw 166*a*, serving to prevent movement of the adaptor within the tray. A depression 167 adjacent each end of the inner surface of wall 154 registers with a recess 167a in arm 162 of the adaptor for accommodating a spring-pressed ball or the like 167b. The spring-pressed balls, as will be apparent, cooperate with the respective depressions 167 to assist in positioning the adaptor within the tray.

In actual practice, before insertion of the adaptor into the tray, a bottom liner 168 is inserted therein. The liner is composed of a top layer 169 of stainless steel, laminated to a bottom layer 170 of lead.

Figure 10:
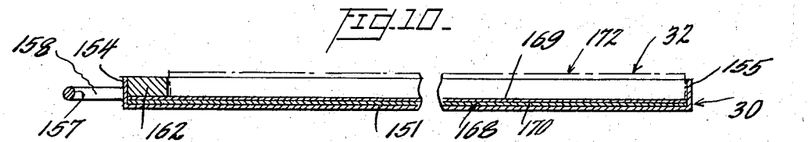
FIG. 10 is an enlarged view in longitudinal cross-section, taken along line 10—10 of FIG. 9.

With the liner 168 and adaptor 160 positioned in the tray, the latter is ready for insertion of a standard X-ray film cassette 32 therein. As illustrated in FIG. 10, the frame 172 of the cassette is of a height exceeding that of the tray walls and accordingly the top of the cassette is disposed in a horizontal plane slightly above that of the top edges of the tray walls. At any rate, when the cassette has been inserted in the tray, leaf springs 156 exert their tension against the outer surface of side 173 of the cassette, to urge the cassette toward and into contact with the inwardly facing surface of arm 163 of the adaptor.

In order to use cassette holders or trays 30, 31 for accommodating conventional Polaroid X-ray film cassettes, the holders or trays may be made ready for accepting such cassettes merely by removing adaptor 160 and liner 168 from the tray, after loosening set-screw 166a. Thereupon, conventional Polaroid X-ray film cassettes, one of which is indicated generally by reference character 32P in FIGS. 12 and 13, may be inserted into the cassette holders or trays 30, 31. Cassettes 32P may hold any suitable form of Polaroid X-ray film.

The longitudinal and transverse inside dimensions of cassette holders or trays 30, 31 are substantially equal to the corresponding outside dimensions of cassettes 32P, thus enabling the latter to be readily fitted into the holders or trays, in which they are tightly held by the action of springs 156.

Figure 12:
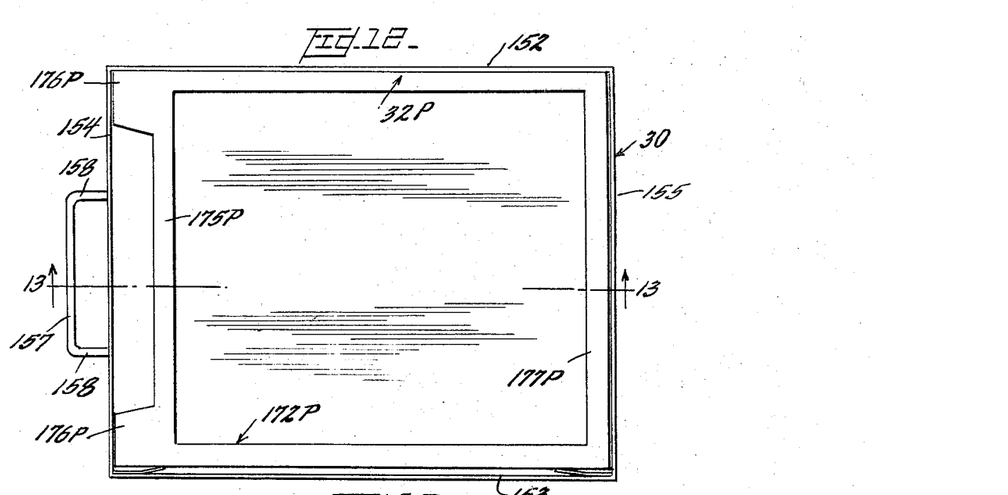
FIG. 12 is a plan view of the cassette holder when used with a Polaroid X-ray film cassette.
Figure 13:
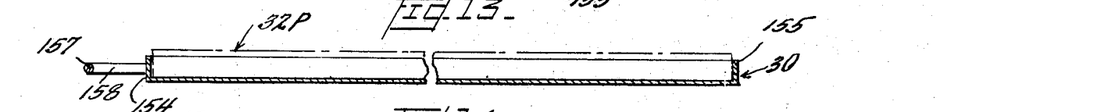
FIG. 13 is an enlarged view in longitudinal cross-section, taken along line 13—13 of FIG. 12.

As shown in FIG. 12, the frame 172P of the cassette 32P has its end 175P thereof disposed adjacent the end wall 154 of the tray. This end of the frame is provided with protruding portions or extensions 176P disposed symmetrically on opposite sides of the longitudinal axis of the cassette. The extensions serve to accommodate hinges (not shown) for connecting the top member with the bottom member of the conventional Polaroid X-ray film cassette.

Chemicals for developing the Polaroid film are contained in a rupturable bag-like container (not shown) attached to the edge of the film disposed along the end 177P of frame 172P, and are brought into play when the container is ruptured in the customary process of developing exposed Polaroid X-ray film. This occurs during removal of the film from the cassette, after the latter has been removed from the holders or trays 30, 31 withdrawn from the respective housings 12, 13, as hereinbefore set forth.

Figure 14:
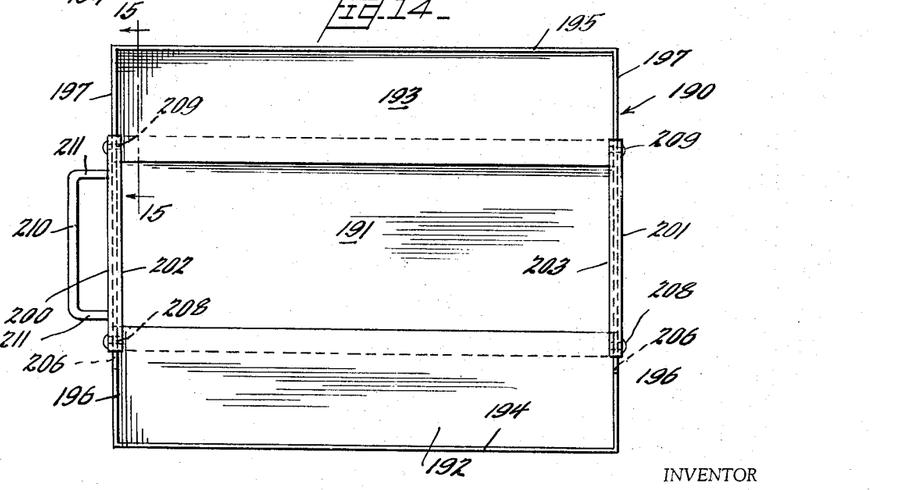
FIG. 14 is a view in plan, illustrating a modified form of means that may be utilized for adapting the cassette holder for selective use as aforementioned.
Figure 15:
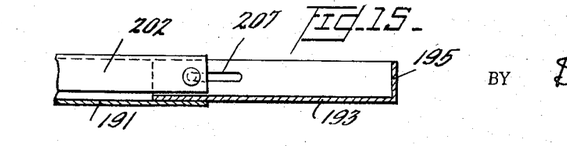
FIG. 15 is a fragmentary view thereof in cross-section, taken along line 15—15 of FIG. 14.

FIGS. 14 and 15 are views showing another form of cassette holder which may be employed in accordance with the invention for selective use with either standard of Polaroid X-ray film cassettes.

In this embodiment, the cassette holder, in lieu of being in the form of a tray with a removable adaptor as in the embodiment of FIGS. 9 to 13, is in the form of a slidably adjustable, three-section holder, indicated generally by reference numeral 190.

This form of the holder comprises a central section 191 of rectangular outline, and two side sections 192, 193 of similar outline. Each of the sections 192, 193 is slidable transversely thereof and with respect to central section 191. Sections 192 and 193 are each formed along its outer longitudinal edge with a vertically extending lip or flange 194, 195, respectively, and along each of its opposite transverse edges with a similar lip or flange 196, 197, respectively.

The central section 191 is provided along each of its transverse edges with a vertically extending lip or flange 200, 201, respectively, and each of these lips is provided at the upper edge thereof with a downwardly extending return-bent or folded-down portion 202, 203, respectively. The bends or folds are preferably disposed at a distance from the upper surface of the base or bottom of section 191 slightly in excess of the height of flanges 196, 197. The bends or folds, furthermore, are fashioned to permit flanges 196 of the side section 192, and likewise flanges 197 of side section 193, to be disposed in the space between flanges 200, 201 and their respective return-bent portions 202, 203, and to be slidable back and forth therein by exerting relatively light force on flanges 194, 195, sufficient to overcome whatever slight frictional contact there may occur between the opposite surfaces of the flanges 196, 197 and the confronting surfaces of flanges 200, 201 and their respective return-bent portions 202, 203.

In order to guide the aforesaid transverse movement of side sections 192, 193 with respect to central section 191 and to retain the side sections in their desired positions with respect to the central section whereby to enable holder 190 selectively to accommodate either standard X-ray film cassettes or Polaroid X-ray film cassettes, flanges 196 and 197 of the side sections may each be provided with a relatively elongated slot 206, 207, for reception of and coaction with captive screws 208, 209 disposed in flanges 200, 201 of the central section, adjacent each end of the flanges. Slots 206, 207 each has its inner end located at a point such that upon loosening of screws 208, 209, the maximum distance which each of the side sections 192, 193 may be slid outwardly with respect to central section 191 will leave the inner longitudinal margin of the base of each of these sections overlapping the corresponding margin of the base of the central section by a distance of several inches. The outer end of each of the slots is located at a point such that when side sections 192, 193 have each been slid in the opposite direction to their maximum extent, the inner longitudinal edge of one of the sections 192, 193 will abut or be disposed closely adjacent that of the other. Thus, by such sliding movement of sections 192, 193 with respect to section 191 to any desired position between the ends of slots 206, 207, followed by tightening of the captive screws 208, 209, the effective transverse dimension of holder 190, i.e. the distance between the inner surfaces of flanges 194 and 195, may be readily adjusted to accommodate and rigidly hold in position, either a standard or a Polaroid X-ray film cassette. As will be understood, with this construction of the cassette holder, the longitudinal dimension thereof requires no alteration when changing from standard X-ray film cassettes to Polaroid X-ray film cassettes, since in either event, the cassette will be held firmly in position in holder 190 by the tight engagement of the flanges of the holder with the outer edges of the frame of the cassette when the captive screws 208, 209 have been tightened home.

As shown in FIG. 14, a handle 210 is secured to the exterior surface of flange 200 of section 191. As will be understood, the handles on the several holders 190 to be utilized in component H as well as on those to be utilized in compartment L of my apparatus will have their legs 211 suitably varying in length so that the handles of the several holders inserted in housings 12 and 13 will be disposed in staggered relation to one another for functioning in the manner described above in connection with the embodiment of FIGS. 9 to 13, for easy, successive withdrawal of the cassette holders and their contained cassettes (of either standard or Polaroid X-ray film) from components H and L in the use of the apparatus for serial graph purposes.

As well known in radiography, it is desirable to provide means for protection of the attending radiologist and the assisting personnel from the effects of radiation. This may readily be achieved in the serialograph apparatus of my invention by providing suitable openings 215 adjacent each end of side wall 21 of component L, each adapted to receive and freely support an L-shaped member as shown in FIGS. 1 and 2, with it short leg 219 extending down through opening 215 into the space between side wall 21 and wall portion 49k, and with its long leg 221 or 223 extending substantially at a right angle to component L above component H. Supported by legs 221, 223 and extending downwardly therefrom so as substantially to reach the top surface 16 of component H, are curtains 225, 227, respectively, each preferably made of flexible, lead sheeting or like material. When the apparatus is particularly employed for cerebral angiography, the curtain 227 is formed at the lower left corner thereof with a cut-out portion 229 within which the neck of the patient is disposed, as depicted in FIG. 1. When, in such use of the apparatus, it becomes necessary to reverse its position from that shown in FIG. 1 to one in which component L is positioned adjacent the right-hand side of the patient's head, as hereinabove referred to, it is but necessary insofar as the curtains are concerned, to interchange the position of curtain 225 with that of curtain 227 in the openings 215.

What I claim is:

1. A hand portable serialography apparatus for use in X-ray diagnostic procedures, comprising:
   (A) a pair of housings each of generally parallelepiped configuration, having a pair of opposed parallel side walls joined to a pair of opposed parallel end walls, said side and end walls each being joined to a top wall and to a bottom wall, said housings being connected to one another adjacent one of their corresponding side walls for swingable movement of one of said housings relative to the other through an angle of ninety degrees, each of said housings having:
      (1) an opening formed in an end wall thereof each of said openings being configured for inserting a cassette holder into and withdrawing the same from each of said housings, and
      (2) an opening formed in the wall thereof confronting the corresponding wall of the other of said housings, for exposing X-ray film carried by said cassette holders;
   (B) means mounted interiorly of a side wall of one of said housings, for supporting a pivoted member adjacent each end of said side wall of said housing;
   (C) means mounted interiorly of a side wall of the other of said housings and adjacent each end thereof, for receiving said pivoted member;
   (D) a pivoted member disposed in each of said supporting means and extending through each of said receiving means;
   said supporting means being formed with means to cooperate with said pivoted members to permit said swingable movement of said housings relative to one another, for selectively disposing one of said housings either (1) in a position wherein it extends at a right angle to the position of the other housing, or (2) in a position wherein it is superposed over said other housing; and
   (E) means formed on said pivoted member for securing said housings to one another in each of the aforenamed selective positions.

2. An apparatus as defined in claim 1, wherein said supporting and receiving means are constructed to enable said housings to be readily disconnected from and re-connected to one another while said pivoted members remain supported by said supporting means.

3. An apparatus as defined in claim 1, wherein each of said housings is of a depth to hold a plurality of cassette holders each containing an X-ray cassette, and wherein each of said housings is provided with tensioning means on the interior surface of its wall opposite said confronting wall thereof, said tensioning means being disposed so as to urge the cassette holders and their contained cassettes toward said opening in said confronting wall of the respective housings.

4. An apparatus as defined in claim 3, wherein said tensioning means comprises a plurality of transversely spaced leaf springs in one of said housings, and a leaf spring in the other of said housings, said last-named spring being positioned intermediate the longitudinal axis of said other housing and said side wall thereof.

5. An apparatus as defined in claim 1, wherein each of said housings is provided with transversely spaced interior partitions, each extending in a plane at a right angle to said end wall of the respective housings, said partitions in each of the housings being disposed in position to serve as side guides for the insertion and withdrawal of the cassette holders into and out of the respective housings.

6. An apparatus as defined in claim 1, wherein said opening in each of said confronting walls of the housings is bounded by means for selectively supporting either an X-ray grid or a filler plate as a closure for each of said openings.

7. An apparatus as defined in claim 1, wherein each of said housings has an opening formed in each of its end walls for inserting a cassette into and withdrawing the same from each of the housings selectively through said opening in either one of said ends walls thereof, and wherein a detachable cover plate is affixed to the said opening in the end wall of each housing opposite the end wall thereof through which a cassette is inserted and withdrawn as aforesaid.

8. The combination with an apparatus as defined in claim 1, of a plurality of cassette holders, each of the latter being provided with means for selectively positioning therein either a standard X-ray film cassette or a "Polaroid" X-ray film cassette.

9. The combination as defined in claim 8, wherein each of said cassette holders comprises a shallow tray having a substantially rectangular bottom plate, side and end walls each extending substantially at a right angle to said bottom plate and a removable L-shaped adaptor fixedly positioned in said tray with one of its arms disposed adjacent one end wall of the tray and with the other arm thereof disposed adjacent one side wall of the tray, the opposite side wall of the tray having tensioning means secured thereto adjacent each end of the tray, said tensioning means being constrained to exert tension force in a direction toward the longitudinal axis of the tray.

10. The combination as defined in claim 9, wherein each of said trays is provided with a handle secured centrally of one end wall thereof, the gripping portion of the handles of the respective trays being disposed at different distances outwardly of said end wall of the trays.

11. The combination as defined in claim 9, wherein the inside longitudinal and transverse dimensions of the base of said tray, when said adaptor is positioned in the tray, are reduced by the transverse cross-sectional thickness of the respective arms of said adaptor to an extent sufficient to enable a standard X-ray film cassette to be fitted into the tray and to be urged by said tensioning means into contact, at one side thereof, with said second-named arm of the adaptor, said dimensions being sufficient to enable a "Polaroid" X-ray film cassette to be fitted into said tray upon removal of said adaptor therefrom and to be urged by said tensioning into contact with said first-named side wall of the tray.

12. The combination as defined in claim 8, wherein each of said cassette holders comprises a central rectangular section formed with a reversely-folded flange at each of its opposite end edges, and with a pair of rectangular side sections each formed with a wall at its outer longitudinal edge and at each of its opposite end edges, the wall at each end edge of each of said side sections being disposed in one of said reversely-folded flanges of said central section whereby to enable each of said side sections to have slidable movement with respect to said central section in a direction transverse thereof.

13. The combination as defined in claim 12, wherein each of said central sections is provided with a handle secured to one of said reversely-folded flanges thereof, the gripping portion of the handles of the respective holders being disposed at different distances outwardly of said reversely-folded flange of the holders.

14. The combination as defined in claim 12, wherein the maximum extent of said slidable movement of each of the side sections transversely outward with respect to the central section will dispose the inner longitudinal margin of the base of each side section in a position to overlap the corresponding margin of the central section, and the maximum extent of said slidable movement of each side section transversely inward with respect to the central section will dispose the inner longitudinal edges of the side sections adjacent one another, whereby either a standard X-ray film cassette or a Polaroid X-ray film cassette may selectively be retained in firm position in said holder by slidably adjusting the position of said side sections transversely with respect to said central section.

15. The combination as defined in claim 8, wherein each of said casette holders is provided with a handle secured centrally of one end of the holder, the gripping portion of the handles of the respective holders being disposed at different distances outwardly of said ends thereof.

References Cited by the Examiner

UNITED STATES PATENTS

| 2,552,858 | 5/1951 | Mueller et al. | 250—58 |
| 2,794,128 | 5/1957 | Shasky | 250—108 |
| 2,826,702 | 3/1958 | Campbell et al. | 250—58 |
| 2,847,580 | 8/1958 | Arvanetakis et al. | 250—66 |
| 2,919,625 | 1/1960 | Muller et al. | 250—68 X |

FOREIGN PATENTS

| 972,711 | 2/1951 | France. |
| 1,104,487 | 11/1955 | France. |

RALPH G. NILSON, *Primary Examiner.*

W. F. LINDQUIST, *Assistant Examiner.*